(12) United States Patent
Wu et al.

(10) Patent No.: US 9,678,237 B2
(45) Date of Patent: Jun. 13, 2017

(54) METHOD AND APPARATUS FOR OPTIMIZING DEEP RESISTIVITY MEASUREMENTS WITH MULTI-COMPONENT ANTENNAS

(71) Applicant: Halliburton Energy Services, Inc., Houston, TX (US)

(72) Inventors: Hsu-Hsiang Wu, Sugar Land, TX (US); Burkay Donderici, Houston, TX (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 34 days.

(21) Appl. No.: 14/650,170

(22) PCT Filed: Dec. 19, 2012

(86) PCT No.: PCT/US2012/070584
§ 371 (c)(1),
(2) Date: Jun. 5, 2015

(87) PCT Pub. No.: WO2014/098838
PCT Pub. Date: Jun. 26, 2014

(65) Prior Publication Data
US 2015/0309201 A1  Oct. 29, 2015

(51) Int. Cl.
*G01V 3/08* (2006.01)
*G01V 3/28* (2006.01)
(Continued)

(52) U.S. Cl.
CPC .................. *G01V 3/08* (2013.01); *G01V 3/28* (2013.01); *G01V 3/38* (2013.01); *E21B 47/026* (2013.01); *G01V 11/00* (2013.01)

(58) Field of Classification Search
CPC combination set(s) only.
See application file for complete search history.

(56) References Cited

U.S. PATENT DOCUMENTS 5,757,191 A  5/1998  Gianzero
5,854,991 A  12/1998  Gupta et al.
(Continued)

FOREIGN PATENT DOCUMENTS

CN  1222978 A  7/1999
CN  1764851 A  4/2006
(Continued)

OTHER PUBLICATIONS

International Preliminary Report on Patentability issued in related PCT Application No. PCT/US2012/070584, mailed on Jul. 2, 2015 (12 pages).

(Continued)

*Primary Examiner* — Clayton E LaBalle
*Assistant Examiner* — Jas Sanghera
(74) *Attorney, Agent, or Firm* — Benjamin Fite; Baker Botts L.L.P.

(57) ABSTRACT

According to aspects of the present disclosure, systems and methods for optimizing deep resistivity measurements are described herein. The method may include obtaining one or more first multi-component measurements from a downhole tool disposed in a borehole. The downhole tool may comprise multi-component antennae. A relative structural dip angle, Φ, of the downhole tool relative to formations may be determined, for example, through the use of an additional downhole tool, or computationally using the one or more first multi-component measurements. A tilt angle of at least one of the multi-component antenna may be adjusted, with the adjusted tilt angle being based on the dip angle. The method may further include obtaining one or more second multi-component measurements associated with the adjusted tilt angle, and determining a formation characteristic based, at least in part, on the one or more second (Continued)

multi-component measurements, without including or considering formation anisotropy effects.

20 Claims, 6 Drawing Sheets

(51) Int. Cl.
*G01V 3/38* (2006.01)
*E21B 47/026* (2006.01)
*G01V 11/00* (2006.01)

(56) References Cited

U.S. PATENT DOCUMENTS

| | | |
|---|---|---|
| 5,966,013 A | 10/1999 | Hagiwara |
| 6,163,155 A | 12/2000 | Bittar |
| 6,181,138 B1 | 1/2001 | Hagiwara et al. |
| 6,393,364 B1 | 5/2002 | Gao et al. |
| 6,760,666 B2 | 7/2004 | Hagiwara |
| 6,998,844 B2 | 2/2006 | Omeragic et al. |
| 7,557,579 B2 | 7/2009 | Bittar |
| 7,948,238 B2 | 5/2011 | Bittar |
| 8,089,268 B2 | 1/2012 | Wang |
| 2002/0186013 A1 | 12/2002 | Tabarovsky et al. |
| 2003/0075361 A1* | 4/2003 | Terry ............... G01V 3/30 175/61 |
| 2003/0229450 A1 | 12/2003 | Strickland et al. |
| 2005/0083061 A1* | 4/2005 | Tabanou ............ G01V 3/28 324/334 |
| 2009/0015261 A1 | 1/2009 | Yang et al. |
| 2009/0192713 A1 | 7/2009 | Fang et al. |
| 2009/0230968 A1 | 9/2009 | Bittar et al. |
| 2012/0105076 A1* | 5/2012 | Li ................... G01V 3/24 324/601 |

FOREIGN PATENT DOCUMENTS

| | | |
|---|---|---|
| CN | 101454690 A | 6/2009 |
| RU | 2304292 C2 | 8/2007 |
| RU | 2326414 C1 | 6/2008 |

OTHER PUBLICATIONS

International Search Report and Written Opinion issued in related PCT Application No. PCT/US2012/070584 mailed Sep. 12, 2013, 15 pages.
Office Action issued in related Russian Application No. 2015122108, mailed Oct. 19, 2016 (14 pages).
Office Action issued in related Chinese Application No. 201280077326.3, mailed Aug. 17, 2016.

\* cited by examiner

METHOD AND APPARATUS FOR OPTIMIZING DEEP RESISTIVITY MEASUREMENTS WITH MULTI-COMPONENT ANTENNAS

CROSS-REFERENCE TO RELATED APPLICATION

The present application is a U.S. National Stage Application of International Application No. PCT/US2012/070584 filed Dec. 19, 2012, which is incorporated herein by reference in its entirety for all purposes.

BACKGROUND

The present disclosure relates generally to well drilling operations and, more particularly, to a method and apparatus for optimizing deep resistivity measurements with multi-component antennas.

Well drilling operations typically require surveys and measurements to determine formation boundary conditions. These surveys and measurements may be essential to targeting particular formation strata. In certain instances, the surveys or measurements may use near-bit sensors to "look-ahead" of the bit to determine a formation resistivity, which can be used to determine formation boundaries through the use of inversion techniques. The accuracy of resistivity measurements, and therefore the accuracy of the boundary determinations, is largely dependant on formation anisotropy. Formation anisotropy may be associated with laminated sediments that produce a horizontal resistivity (Rh) in a direction parallel to the formation plane that is different from, and typically lower than, a vertical resistivity (Rv) in a direction perpendicular to the formation plane. The presence of formation anisotropy may alter the "look-ahead" signals, leading to a misinterpretation of the formation geology unless computationally intensive and costly inversion techniques and models are used to account for the anisotropy effects.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to a method and apparatus for optimizing deep resistivity measurements with multi-component antennas.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Figure 1:
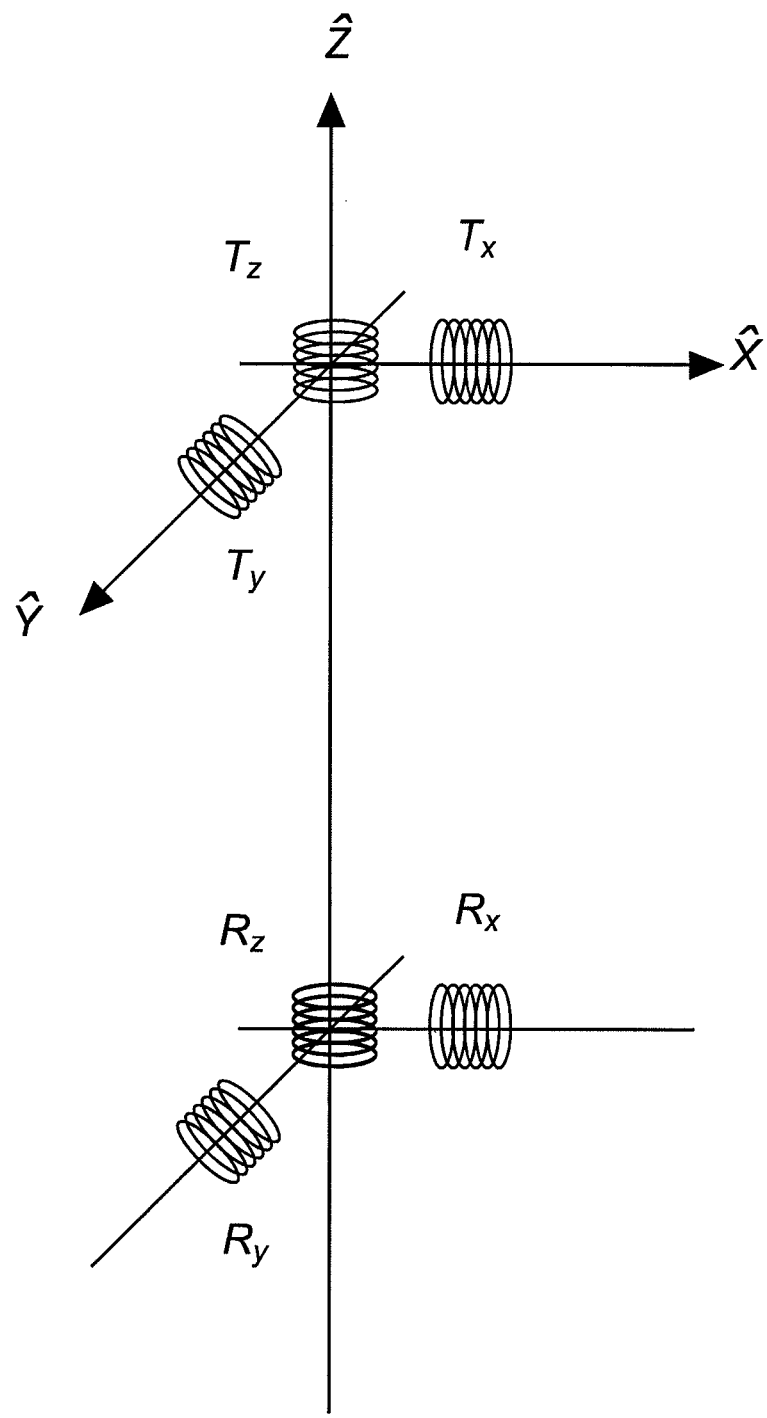
FIG. 1 illustrates an example antenna arrangement for a multi-component electromagnetic logging tool, according to aspects of the present disclosure.

According to aspects of the present disclosure, systems and methods for optimizing deep resistivity measurements are described herein. The method may include obtaining first multi-component inductive measurements from a downhole tool disposed in a borehole. The downhole tool may comprise multi-component antennae, as will be described below. In one embodiment, as can be seen in FIG. 1, the multi-component tool may comprise a combination of three mutually orthogonal transmitters (Tx, Ty, and Tz) and three mutually orthogonal receivers (Rx, Ry, and Rz), from which nine independent measurements can be made. In other embodiments, as will be described in detail below, a tool with a minimum of two of these components may be utilized. For example, as will be discussed with respect to FIG. 5, a tilted antenna that is rotating downhole can be utilized to acquire multi-component measurements based on the aziumthal signals of the tool per rotation, with the azimuthal signals being decoupled to calculate individual coupling components. Accordingly, a tilted transmitter or a tilted receiver may be a multi-component antenna within the scope of this disclosure.

The method may further include determining a relative structural dip angle, $\Phi$, of the downhole tool. As will be described in greater detail below, the dip angle may be determined, for example, through the use of an additional downhole tool, or computationally using the first multi-component measurements. The relative structural dip angle may be determined from tool coordinates and may be relative to the tool axis, with the structural dip being associated with the angle of a vertical resistivity axis as opposed to the formation boundary dip angle. In formations that do not exhibit crossbedding, the relative structural dip angle may be equal to the relative dip angle of the formation boundary. In certain embodiments, the relative structural dip angle measurements may be converted to absolute measurements that are relative to a fixed coordinate such as earth gravity or magnetic axis by using geometrical manipulations that would be appreciated by one of ordinary skill in the art in view of this disclosure.

The method may further include adjusting a tilt angle of at least one of the multi-component antenna, with the adjusted tilt angle being based on the relative structural dip angle. The method may further include obtaining second multi-component inductive measurements associated with the adjusted tilt angle. As will be described below, obtaining second multi-component inductive measurements associated with the adjusted tilt angle may comprise computationally altering the first multi-component measurements to account for the adjusted tilt angle. A formation characteristic then may be determined based, at least in part, on the second multi-component inductive measurements. For example, the formation characteristic may comprise a deep resistivity measurements or distance to a formation boundary that is determined using the multi-component measurements via inversion and/or any resistivity conversion schemes. Advantageously, as will be described below, the formation characteristic may be determined without including or considering anisotropy effects, which may reduce the computational intensity of the determination.

Figure 2:
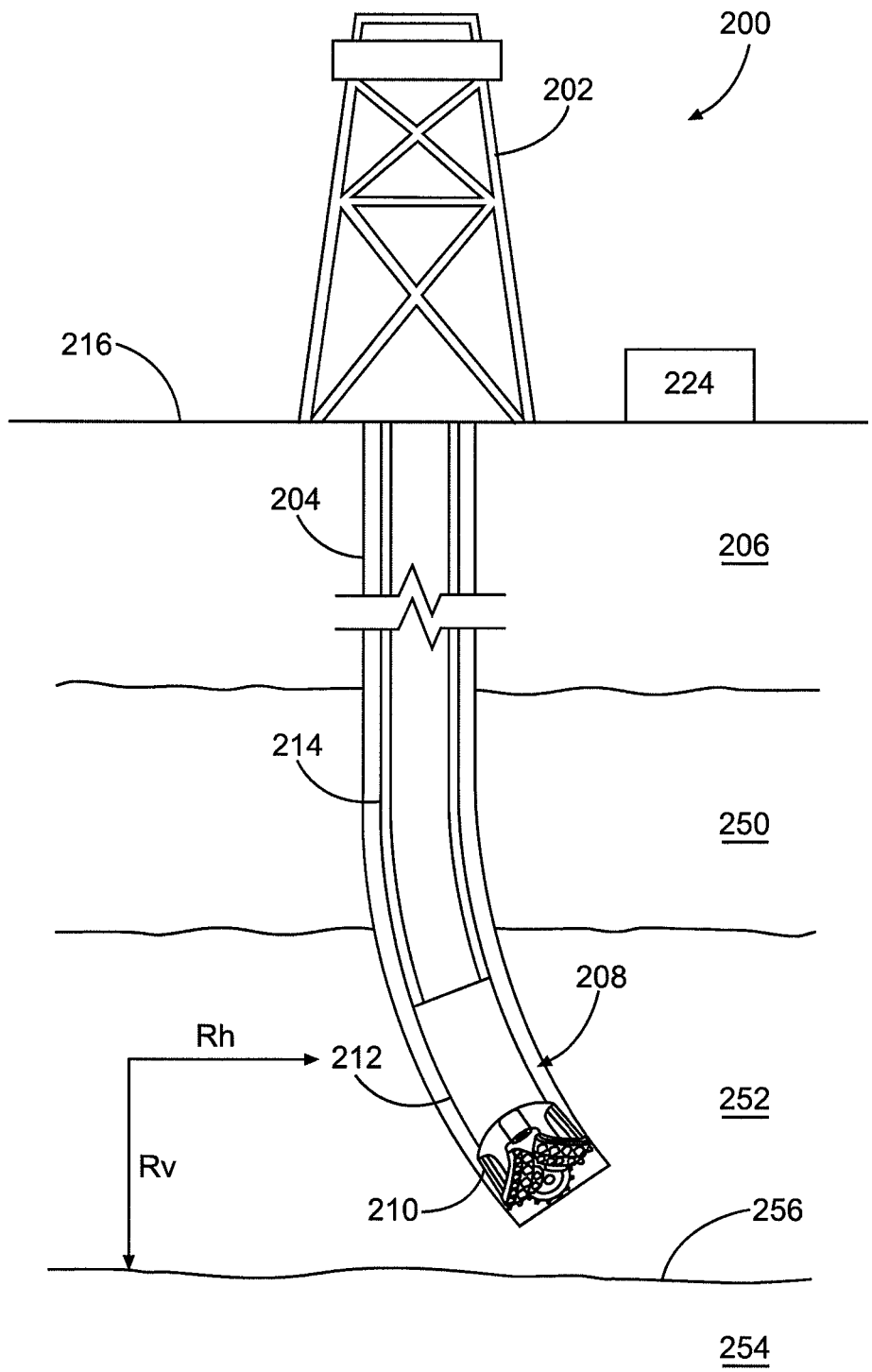
FIG. 2 illustrates an example drilling system, according to aspects of the present disclosure.

FIG. 2 shows an example drilling system 200, according to aspects of the present disclosure. The drilling system 200 includes a rig 202 mounted at the surface 216 and positioned above a borehole 204 within a subterranean formation 206. The rig 202 may be connected to a drill string 214 disposed in borehole 204. The drill string 214 may comprise a plurality of drill string segments and a bottom hole assembly (BHA) 208. The BHA 208 may comprise, for example, a drill bit 210 and a measurement and/or logging section 212 containing a plurality of measurement or logging devices. The measurement or logging devices may comprise a variety of antennae and sensors to measure or log the formation 206 during drilling operations. In certain embodiments, the measurement or logging section may include multi-component antennae for acquiring multi-component measurements.

Figure 3:
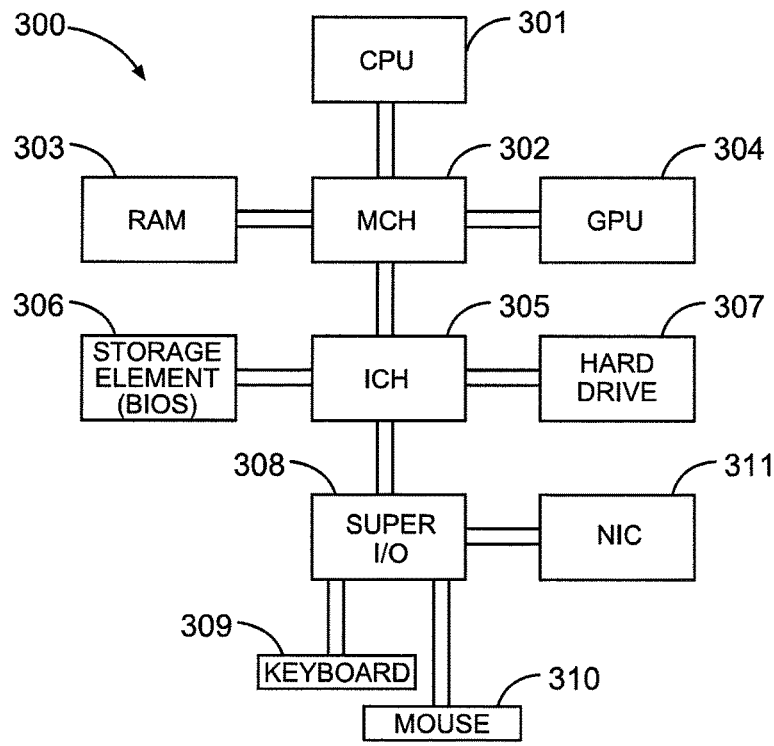
FIG. 3 illustrates an example information handling system, according to aspects of the present disclosure.

In certain embodiments, the downhole electronic equipment, including measurement or logging section 212, may communicate with a control system 224 at the surface. The control system 224 may comprise an information handling system comprising at least one processor for receiving and processing measurements collected downhole. In certain embodiment, the measurement or logging section 212 may also include some processing capabilities. Shown in FIG. 3 is a block diagram of an example information handling system 300. A processor or CPU 301 of the information handling system 300 may be communicatively coupled to a memory controller hub or north bridge 302. The memory controller hub 302 may be coupled to RAM 303 and a graphics processing unit 304. Memory controller hub 302 may also be coupled to an I/O controller hub or south bridge 305. I/O hub 305 may be coupled to storage elements of the computer system, including a storage element 306, which may comprise a flash ROM that includes the BIOS of the computer system. I/O hub 305 is also coupled to the hard drive 307 of the computer system. The hard drive 307 may be characterized as a tangible computer readable medium that contains a set of instructions that, when executed by the processor 301, causes processor 301 to perform a predetermined set of operations. For example, according to certain embodiments of the present disclosure, and as will be discussed below, the hard drive 307 may contain instructions that when executed cause the CPU 301 to obtain multi-component measurements from downhole multi-component antennae and perform complex computations on the multi-component measurements, including computationally altering measurements associated with distinct antenna orientations. The instructions may further cause the CPU 301 to determine a formation characteristic based on the altered measurements.

In certain embodiments, I/O hub 305 may also be coupled to a super I/O chip 308, which is itself coupled to several of the I/O ports of the computer system, including keyboard 309, mouse 310, and one or more parallel ports. The super I/O chip 308 may further be coupled to a network interface card (NIC) 311. The information handling system 300 may receive measurements or logs from the logging tool 212 over the NIC 311, for processing or storage on a local storage device, such as hard drive 307. In certain embodiments, the measurement and log data from a logging tool may first be transmitted and saved at a dedicated mass storage device (not shown). This may increase the speed with which the data generated by the logging tool 212 can be stored. The information handling system may then retrieve measurement data from the dedicated storage device, and perform computations on the data using algorithms stored locally within hard drive 307.

Returning to FIG. 2, the borehole 204 may penetrate the formation 206, which may comprise strata 250, 252, and 254. Each of the strata 250, 252, and 254 may have different resistivity values that depend on the composition of the formation. The layering of the strata may create boundaries between the strata, such as boundary 256. Identifying the boundaries may be important for a variety of drilling operations, including locating the drill bit with the appropriate strata for hydrocarbon production. In certain embodiments, measurement or logging section 212 may comprise near-bit sensors that "look-ahead" of the bit to identify formation resistivity, which can then be processed to identify the boundaries.

In anisotropic formations, which are often associated with laminated sediments, the effective depths of the "look ahead" measurements are reduced unless costly and computationally complex calculations are used. An anisotropic formation may be characterized by a formation in which the resistivity in a direction parallel to the formation plane, horizontal resistivity (Rh), is lower that the resistivity in a direction perpendicular to the formation plane, vertical resistivity (Rv). The presence of formation anisotropy, or vertical resistivity, can alter the "look ahead" measurements, leading to a misinterpretation of formation geology unless complex formation models and inversion techniques are used to adjust for the anisotropy. As will be discussed below, the present disclosure describes a system and method for optimizing the "look ahead" measurements by aligning the downhole antennae to be parallel with Rv, to eliminate the anisotropy effect.

Figure 4:
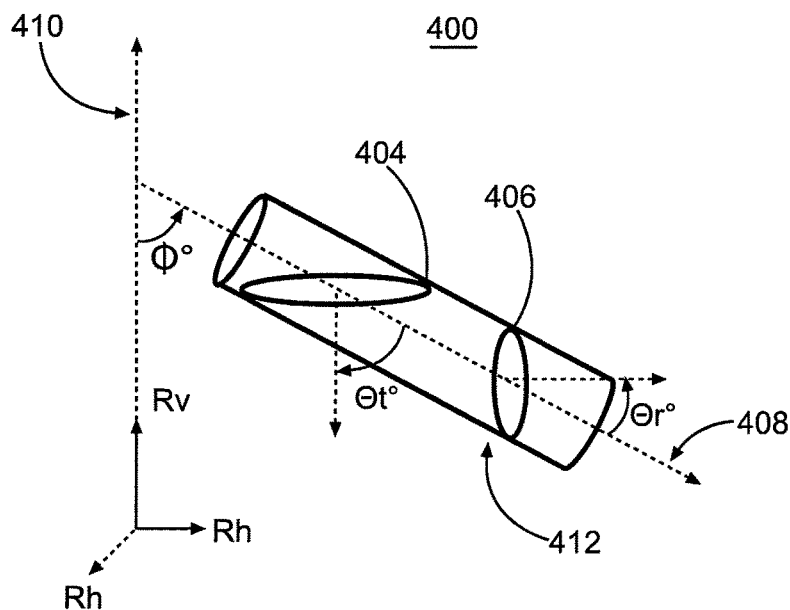
FIG. 4 illustrates an example measurement apparatus, according to aspects of the present disclosure.

FIG. 4 illustrates an example logging tool 412 located in a homogeneous anisotropic formation model 400, according to aspects of the present disclosure. The logging tool 412 includes a transmitter 404 and a receiver 406. In the present embodiments, the transmitter 404 and receiver 406 comprise loop antenna, but other configurations are possible. The formation model 400 may include a horizontal resistivity Rh, and a vertical resistivity Rv, which is perpendicular to the Rh plane as indicated by line 410. The axis of the logging tool 412 may be positioned within the formation 400 along line 408. The angle Φ between the Rv plane of the formation model 400 and the line 408 may be the relative structural dip angle of the logging tool 412. The transmitter 404 may be arranged at a tilt angle Θt with respect to the axis of the logging tool 412, and the receiver 406 may be arranged at a tilt angle Θr with respect to the axis of the logging tool 412.

According to aspects of the present disclosure, the formation anisotropy of the formation model 400 may be eliminated by adjusting the orientation of either the transmitter 404 or the receiver 406 to be parallel with the Rv plane. For example, with respect to the model shown in FIG. 4, to be parallel with the Rv plane, the transmitter 404 may be orientated at a tilt angle Θt of −Φ or 180−Φ. Similarly, the receiver 406 may be oriented to be parallel with the Rv plane by setting the tilt angle Θr at −Φ or 180−Φ. Notably, only one of the transmitter or the receiver must be oriented relative to the Rv plane to eliminate the vertical anisotropy.

When deployed downhole, however, the position and orientation of the receiver and transmitter may be arbitrary. According to aspects of the present disclosure, as will be described below, instead of physically altering the position or orientation of the transmitter or receiver, the orientations may be changed computationally by summing multiple measurements and/or components with weights. These weights may be chosen to achieve the desired orientation based on vector theory and linear algebra, as would be appreciated by one of ordinary skill in view of this disclosure. For example, an x-axis directed measurement and a z-axis directed measurement can be summed with equal weights to produce a measurement associated with a hypothetical antenna with 45 degree tilt angle with respect to the z-axis. In certain embodiments, a tool with multi-component antenna, such as tools 500 and 520 in FIG. 5, may be used to facilitate the computational reorientation of the transmitter or the receiver. The tools may be, for example, LWD tools that are coupled to a drill string or BHA during drilling operations. The tools may also be wireline tools that are deployed downhole apart from a drill string.

Tool 500 includes multi-component antenna, tilted receivers R1 and R2 and tilted transmitter Tx. The receivers and transmitters comprise antenna positioned on an outer surface of the tool. As can be seen, the two tilted receivers R1 and R2 are located at the same distance d from the tilted transmitter Tx. The tilted receiver R1 has a tilt angle Θr1 from the z-axis of the tool 500. Tilted receiver R2 has a tilt angle Θr2 from the z-axis of the tool 500. Tilted transmitter Tx has a tilt angle Θt from the z-axis of the tool 500. Similarly, tool 520 includes multi-component antenna, tilted transmitters T1 and T2 and tilted receiver Rx. As can be seen, the two tilted transmitters T1 and T2 are located at the same distance d from the tilted receiver Rx. The tilted transmitter T1 has a tilt angle Θt1 from the z-axis of the tool 520. Tilted transmitter T2 has a tilt angle Θt2 from the z-axis of the tool 520. Tilted receiver Rx has a tilt angle Θr from the z-axis of the tool 520.

As will be appreciated by one of ordinary skill in view of this disclosure, tools with multi-component antenna, such as those described above with respect to FIGS. 1 and 5, may generate measurements that can be analytically solved using nine magnetic coupling equations that would be appreciated by one of ordinary skill in view of this disclosure. Once these equations are solved, the effective tilt angle of at least one of the transmitters or receivers can be computationally adjusted based on the relative structural dip angle of the downhole tool to align the dipole direction of the antenna with Rv, as shown in FIG. 4. As mentioned above, the dip angle can be either provided by other logging tools, such as imaging tool, and/or be calculated through the use of an inversion based on the solved nine coupling components from particular antenna configuration of tool 500 or tool 520.

Figure 5:
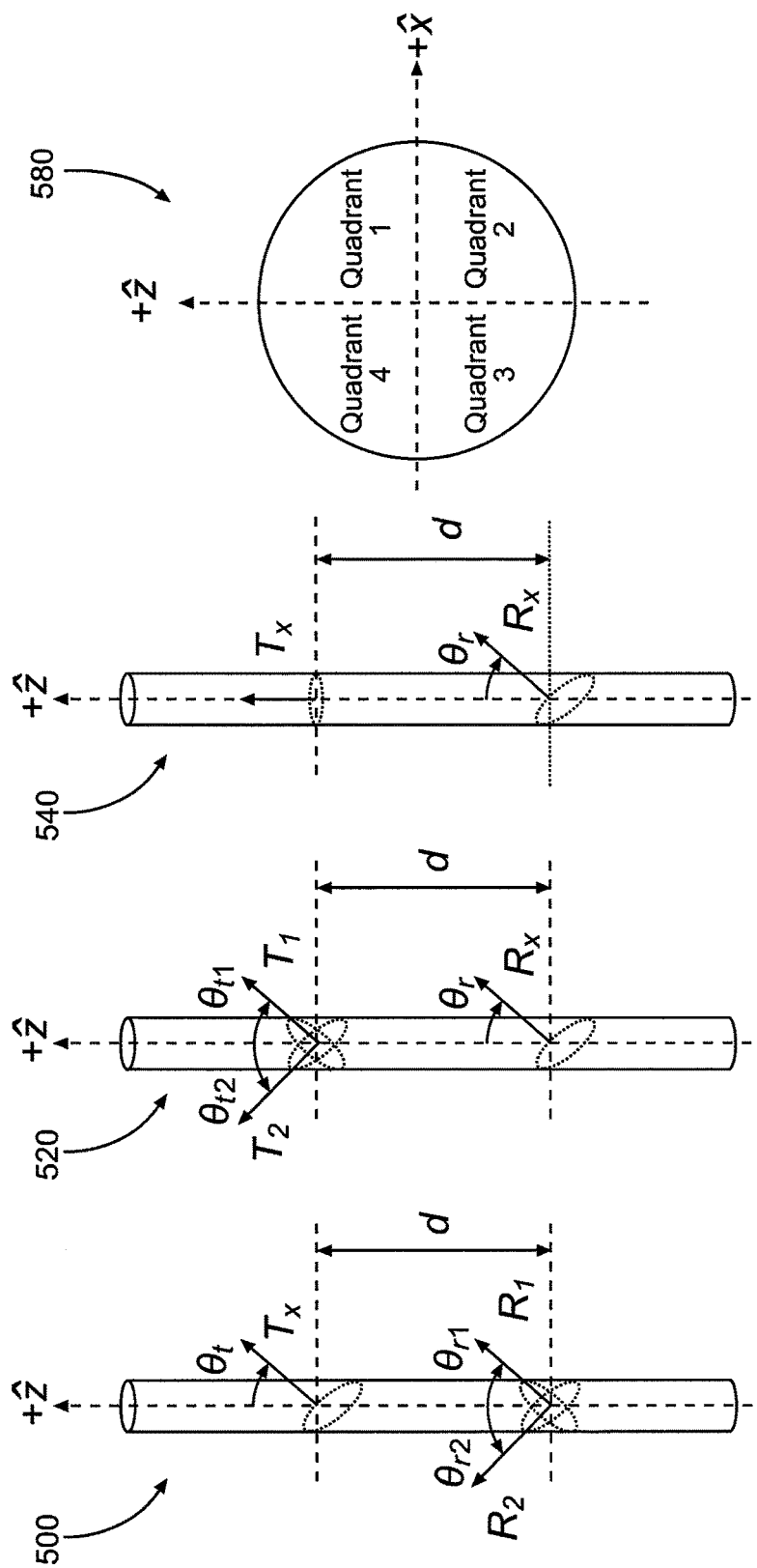
FIG. 5 illustrates an example measurement apparatus, according to aspects of the present disclosure.

Notably, tools used within the scope of this disclosure to facilitate the computational reorientation of the sensors are not limited to the embodiments shown in FIGS. 1 and 5. According to some aspects of the present disclosure, the multi-component tools may be used to both identify the relative structural dip angle of the tool and to facilitate the computation reorientation of the sensors. These tools may include at least one tilted transmitter and two tilted receivers, or at least one tilted receiver and two tilted transmitters, with the two tilted receivers or the two tilted transmitters located equidistant from the respective at least one transmitter or the at least one receiver. For example, in tool 500, the tilted receivers are not required to be at the same location; rather, one of the tilted receivers can be moved to the opposite side of the tilted transmitter at a distance d. Additionally, in certain embodiments, the tilt angles of the at least one transmitter Tx or the at least one receiver Rx can be arbitrary, as can one of the two receivers R1 and R2 or one of the two transmitters T1 and T2, provided the other one of the two receivers R1 and R2 or one of the two transmitters T1 and T2 is tilted in an adjacent quadrant from the other one of the two receivers R1 and R2 or one of the two transmitters T1 and T2, as can be seen in diagram 580 in FIG. 5. With respect to tool 500, for example, the tilt angle Θr1 of the receiver R1 places the receiver R1 in quadrant one, meaning the tilt angle Θr2 of receiver R2 can place the receiver R2 in either quadrant 2 or quadrant 4.

Although, tools 500 and 520 may be used to both identify the relative structural dip angle of the tool and to facilitate the computation reorientation of the sensors, if the dip angle is provided by some other means, such as an additional tool, the multi-component tool can have a simpler configuration. For example, tool 540 consists of one multi-component antenna Rx and one non-tilted antenna Tx, rather than having an additional receiver or transmitter. Tool 540, and similarly configured tools, can be utilized to computational adjust the tilt angle of multi-component antenna of the tool, but not to determine the relative structural dip angle. Although 540 is shown with a non-tilted transmitter Tx, and a tilted receiver Rx, other configurations are possible, such as a tilted transmitter and a non-tilted receiver.

Figure 6:
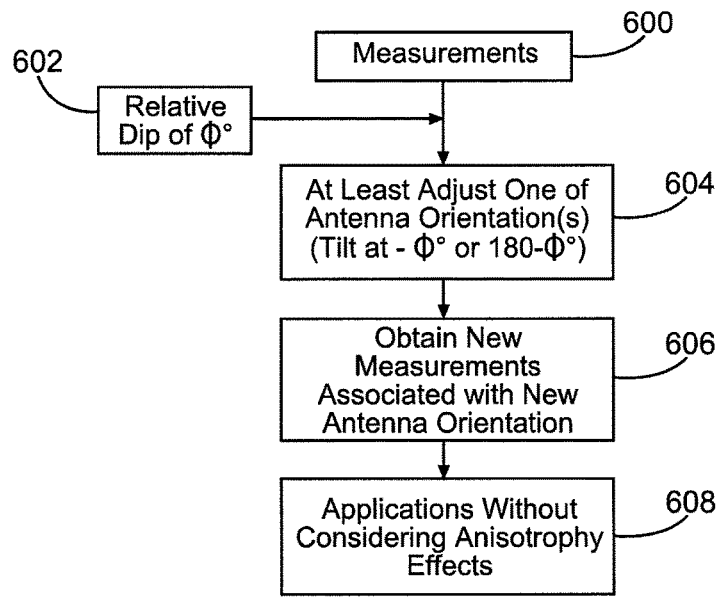
FIG. 6 illustrates an example optimization method, according to aspects of the present disclosure.

FIG. 6 illustrates an example method for optimizing deep resistivity measurements by eliminating anisotropy effects. Step 600 includes obtaining multi-component measurements from a downhole tool, which may include tools with multi-component antennae similar to those described above with respect to FIG. 5. The multi-component measurements may be obtained downhole and transmitted to a control unit at the surface via a wireline or a telemetry system. At step 602 a relative structural dip angle Φ of the tool may be determined. In certain embodiments, the relative structural dip angle Φ can be obtained by additional downhole tools that operate at a higher frequency that the original downhole tool, as would be appreciated by one of ordinary skill in view of this disclosure. At step 604, a tilt angle of at least one of the multi-component antenna can be adjusted to either −Φ or 180−Φ, in order to align with the vertical resistivity Rv plane, as described in FIG. 4. The tilt angles of the multi-component antennae can be adjusted computationally, such as, for example, by adjusting a tilt angle of an antenna within a measurement model in an information handling system at the surface. At step 606, new measurements associated with the adjusted antenna orientation may be obtained based on the adjusted tilt angle in the measurement model. New measurements may be obtained, for example, by recomputing the original measurements from the model, assuming that the tilt angle of the at least one of the antenna is the adjusted tilt angle. Notably, as described above, one can assume that the new measurements eliminate formation anisotropy effects, and therefore, the measurements can be used to determine formation characteristics, at step 608, without the additional computational complexity of adjusting for the anisotropy effects, including formation resistivity and a distance to a formation boundary.

As described above, downhole logging while drilling (LWD) tools may be used to determine the relative structural dip angle of the borehole. These tools include Halliburton's Azimuthal Deep Resistivity sensor (ADR), Halliburton's Azimuthal Deep Resistivity sensor with tilted transmitter (ADR-TT), dipmeters and borehole imaging tools. Such measurements are sensitive to formation anisotropy and relative dip angle, especially for horizontal drilling activity. For ultra deep resistivity determinations, measurements made by ADR or ADRTT are limited in their range, and therefore can be applied into a zero-dimensional (0D) anisotropic inversion to compute formation anisotropy and relative dip angle surrounding the tool. However, if formation anisotropy ratio is small or the tool is very close to a formation boundary, the inverted dip angle determined using the ADR or ADR-TT might be inaccurate.

Figure 7:
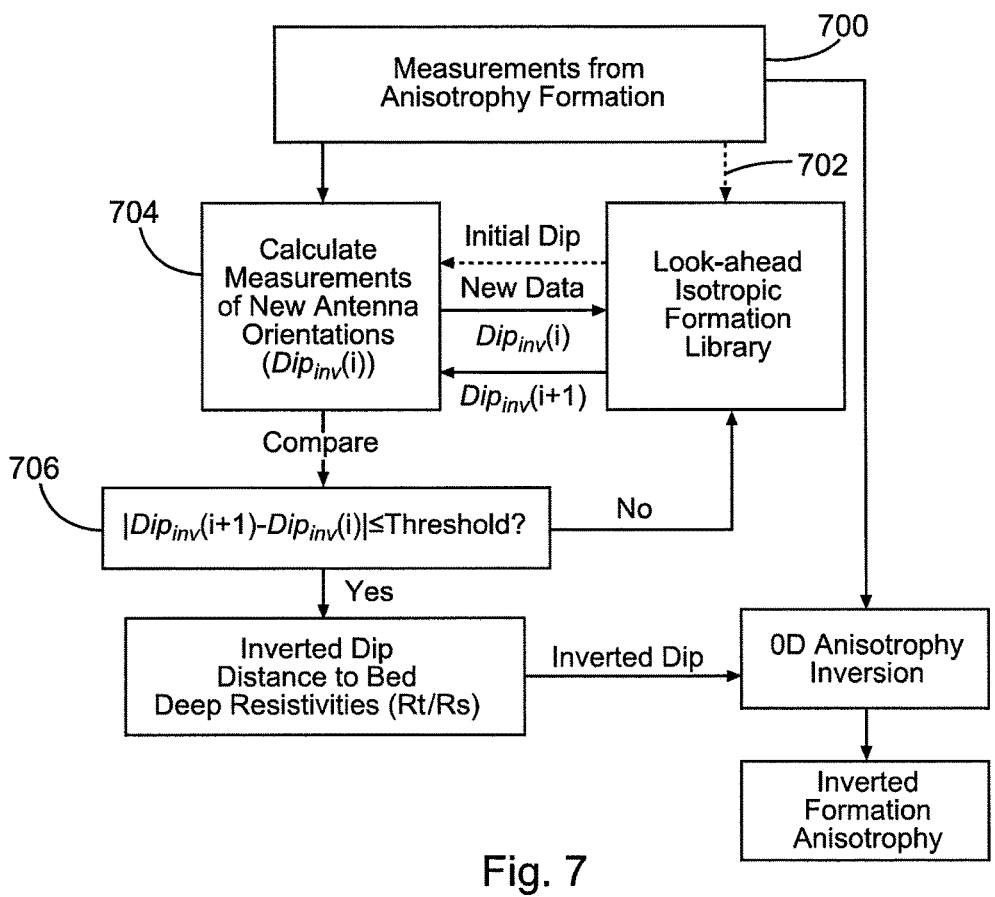
FIG. 7 illustrates an example optimization method, according to aspects of the present disclosure.
Figure 8:
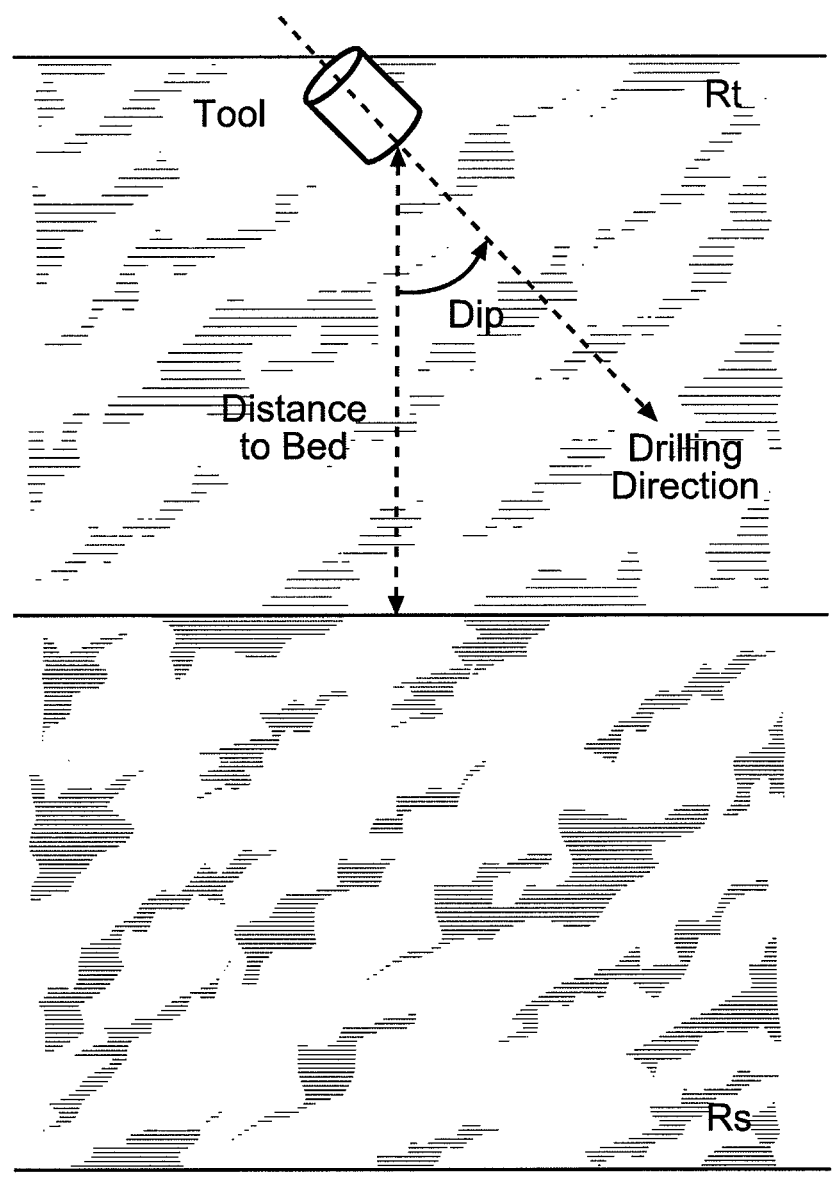
FIG. 8 illustrates an example isotropic formation model, according to aspects of the present disclosure.

According to aspects of the present disclosure, FIG. 7 illustrates an example inversion scheme to determine a relative dip angle for a downhole tool, eliminate the formation anisotropy effect, and achieve an ultra-deep resistivity determination. At step 700, multi-component measurements from an anisotropy formation may be taken by a tool similar to those described above with respect to FIG. 4 and FIG. 5. At step 702, the multi-component measurements may be used in a look-ahead inversion with library responses of isotropic formation models to compute an initial inverted relative structural dip angle, $Dip_{inv}(i)$ and inverted distance to the bed. One example isotropic formation model is the two layer isotropic formation model shown in FIG. 8. As can be seen, the model assumes a tool is located in the upper layer with formation resistivity of Rt, above a lower layer with a formation resistivity Rs. In certain embodiments, the values of Rt and Rs may be known in the inversion, via a conventional resistivity log from an offset well. Accordingly, the isotropic formation model can be used in an inversion operation to compute the two unknown parameters, relative dip angle and distance to the bed.

Step 704 comprises recalculating input measurements by adjusting at least one antenna orientation on the basis of the initial inverted relative structural dip $Dip_{inv}(i)$, as described above, and then inverting a second inverted dip angle $Dip_{inv}(i+1)$ and a corresponding second inverted distance to the bed based on the recalculated measurements. At step 706, the second inverted dip angle $Dip_{inv}(i+1)$ may be compared to the initial inverted dip angle $Dip_{inv}(i)$. This loop of recalculating the input measurements according to subsequent inverted dip angles and then inverting new dip angles can continue until stopping criteria are met. Example stopping criteria is shown in FIG. 7: the loop continues until the absolute difference between the previous inverted dip angle and the current dip angle is less than a pre-defined error threshold, which indicates that a final true inverted dip has been obtained. In certain embodiments, other stopping criteria may be used to determine a final true inverted dip. Once the true relative dip angle is determined, the corresponding inverted distance to the bed will not be affected by formation anisotropy and will be the true distance to bed. This value can then be used in a zero-dimensional anisotropy inversion to accurately determine formation anisotropy.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for optimizing deep resistivity measurements, comprising:
    obtaining one or more first multi-component measurements from a downhole tool disposed in a borehole, wherein the downhole tool comprises at least two antennae;
    determining a relative structural dip angle, $\Phi$, of the downhole tool;
    adjusting a tilt angle of at least one of the at least two antennae relative to the axis of the tool, wherein the adjusted tilt angle is based on the relative structural dip angle of the downhole tool;
    obtaining one or more second multi-component measurements from the downhole tool associated with the adjusted tilt angle of the at least one of the at least two antennae; and
    determining a formation characteristic based, at least in part, on the one or more second multi-component measurements without including anisotropy effects.

2. The method of claim 1, wherein the formation characteristic comprises a distance to a formation boundary.

3. The method of claim 1, wherein determining the relative structural dip angle of the downhole tool comprises obtaining one or more measurements from a second downhole tool.

4. The method of claim 1, wherein determining the relative structural dip angle of the downhole tool comprises iteratively calculating the relative structural dip angle using the one or more first multi-component measurements and an isotropic formation model.

5. The method of claim 1, wherein obtaining one or more second multi-component measurements associated with the adjusted tilt angle comprises computationally altering the one or more first multi-component measurements based on the adjusted tilt angle of at least one of the antennae.

6. The method of claim 1, wherein the adjusted tilt angle comprises $180°-\Phi$ or $-\Phi$.

7. The method of claim 1, wherein the at least two antennae comprise at least one transmitter and at least one tilted or radial receiver, or at least one tilted receiver and at least one tilted or radial transmitter.

8. A system for optimizing deep resistivity measurements, comprising:
   a processor; and
   a memory device coupled to the processor;
   wherein the memory device is a non-transitory medium that contains a set of instructions that when executed by the processor cause the processor to:
      receive one or more first multi-component measurements from a first downhole tool disposed in a borehole, wherein the first downhole tool comprises at least two antennae;
      determine a relative structural dip angle, $\Phi$, of the first downhole tool;
      adjust a tilt angle of at least one of the at least two antennae relative to an axis of the first downhole tool, wherein the adjusted tilt angle is based on the relative structural dip angle;
      obtain one or more second multi-component measurements from the first downhole tool associated with the adjusted tilt angle of the at least one of the at least two antennae; and
      determine a formation characteristic based, at least in part, on the one or more second multi-component measurements without including anisotropy effects.

9. The system of claim 8, wherein the formation characteristic comprises a distance to a formation boundary.

10. The system of claim 8, wherein the set of instructions further causes the processor to receive one or more measurements from a second downhole tool and determine the relative structural dip angle, $\Phi$, of the first downhole tool based on the one or more measurements from the second downhole tool.

11. The system of claim 8, wherein the set of instructions further causes the processor to determine the relative structural dip angle of the first downhole tool by iteratively calculating the relative structural dip angle using the one or more first multi-component measurements.

12. The system of claim 8, wherein the set of instructions further causes the processor to obtain the one or more second multi-component measurements associated with the adjusted tilt angle by computationally altering the one or more first multi-component measurements based on the adjusted tilt angle.

13. The system of claim 8, wherein the at least two antennae comprise at least one transmitter and at least one receiver, wherein at least one of the at least two antennae comprises a multi-component antenna.

14. The system of claim 8, wherein the tilt angle is adjusted either physically or computationally.

15. A method for optimizing deep resistivity measurements, comprising:
   obtaining one or more first multi-component measurements from a downhole tool disposed in a borehole, wherein the downhole tool comprises at least two antennae;
   determining a first relative structural dip angle, $\Phi1$, of the downhole tool based on the one or more first multi-component measurements;
   adjusting at least one of the at least two antennae to a first tilt angle relative to the axis of the tool, wherein the first tilt angle is based on the first relative structural dip angle of the downhole tool;
   obtaining one or more second multi-component measurements of the downhole tool associated with the first tilt angle of the at least one of the at least two antennae;
   determining a second relative structural dip angle, $\Phi2$, of the downhole tool based on the one or more second multi-component measurements;
   if stopping criteria are met, determining a distance to a formation boundary using the one or more second multi-component measurements; and
   if the stopping criteria are not met,
      adjusting the first tilt angle to a second tilt angle, wherein the second tilt angle is based on the second relative structural dip angle,
      obtaining one or more third multi-component measurements associated with the second tilt angle, and
      determining a third relative structural dip angle of the downhole tool based on the one or more third multi-component measurements.

16. The method of claim 15, further comprising:
   if the stopping criteria are not met at an Nth iteration,
      adjusting the $(N-1)^{th}$ tilt angle to the $N^{th}$ tilt angle, wherein the $N^{th}$ tilt angle is based on the Nth relative structural dip angle, $\Phi N$,
      obtaining one or more $(N+1)^{th}$ multi-component measurements associated with the $N^{th}$ tilt angle, and
      determining a $(N+1)^{th}$ relative structural dip angle of the downhole tool based on the one or more $(N+1)^{th}$ multi-component measurements, and
   if the stopping criteria are met, determining a distance to a formation boundary using the $(N+1)^{th}$ multi-component measurements.

17. The method of claim 15, wherein the first tilt angle comprises $180°-\Phi1$ or $-\Phi1$.

18. The method of claim 16, wherein the $N^{th}$ tilt angle comprises $180°-\Phi N$ or $-\Phi N$.

19. The method of claim 15, wherein the distance to the formation boundary is determined without including anisotropy effects.

20. The method of claim 15, wherein the at least two antennae comprise at least one transmitter and at least one tilted or radial receiver, or at least one tilted receiver and at least one tilted or radial transmitter.

* * * * *